United States Patent
Lin et al.

(10) Patent No.: US 9,641,283 B2
(45) Date of Patent: *May 2, 2017

(54) ADAPTIVE MODULATION CODING METHOD AND APPARATUS

(71) Applicant: International Business Machines Corporation, Armonk, NY (US)

(72) Inventors: Yonghua Lin, Beijing (CN); Jianbin Tang, Melbourne (AU); Jun Song Wang, Beijing (CN); Qi Jun Wang, Beijing (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 117 days.

This patent is subject to a terminal disclaimer.

(21) Appl. No.: 14/597,708

(22) Filed: Jan. 15, 2015

(65) Prior Publication Data
US 2015/0215069 A1 Jul. 30, 2015

(30) Foreign Application Priority Data
Jan. 24, 2014 (CN) .......................... 2014 1 0035685

(51) Int. Cl.
*H04L 1/00* (2006.01)
*H04L 27/34* (2006.01)
*H04L 1/20* (2006.01)

(52) U.S. Cl.
CPC .......... *H04L 1/0015* (2013.01); *H04L 1/0009* (2013.01); *H04L 1/0035* (2013.01);
(Continued)

(58) Field of Classification Search
CPC ... H04L 1/0009; H04L 1/0015; H04L 1/0035; H04L 1/20; H04L 1/0026; H04L 1/00; H04L 27/34
See application file for complete search history.

(56) References Cited

U.S. PATENT DOCUMENTS

| 7,889,703 B2 | 2/2011 | Yang et al. |
| 8,553,818 B2 | 10/2013 | Chun et al. |

(Continued)

FOREIGN PATENT DOCUMENTS

| JP | 4506979 B2 | 7/2010 |
| WO | 2011134137 A1 | 11/2011 |

OTHER PUBLICATIONS

Shatila, et al., "Adaptive Modulation and Coding for WIMAX Systems With Vague Channel State Information Using Cognitive Radio," IEEE Performance Evaluation of Computer and Telecommunication Systems, Jul. 2010, pp. 405-409.

(Continued)

*Primary Examiner* — Noel Beharry
*Assistant Examiner* — Ruihua Zhang
(74) *Attorney, Agent, or Firm* — Cantor Colburn LLP; Keivan Razavi (57) ABSTRACT

An adaptive modulation coding method includes obtaining an estimated signal-to-interference-plus-noise ratio (SINR) and a packet error rate (PER) of a communication link of a user terminal; setting a first adjustment amount of the SINR of the communication link according to the PER of the communication link; calculating an effective SINR of the communication link according to the estimated SINR of the communication link and the first adjustment amount of the SINR of the communication link; and determining a modulation coding scheme of the communication link according to the effective SINR of the communication link.

4 Claims, 3 Drawing Sheets

(52) U.S. Cl.
CPC .............. *H04L 1/20* (2013.01); *H04L 1/0003* (2013.01); *H04L 1/0026* (2013.01)

(56) References Cited

U.S. PATENT DOCUMENTS

| | | |
|---|---|---|
| 8,576,771 B2 | 11/2013 | Awad et al. |
| 2010/0002575 A1 | 1/2010 | Eichinger et al. |
| 2013/0065631 A1* | 3/2013 | Lu ..................... H04W 52/242 455/522 |
| 2014/0086206 A1* | 3/2014 | Miyata ................ H04W 72/04 370/330 |
| 2015/0280859 A1 | 10/2015 | Lin et al. |
| 2015/0358982 A1* | 12/2015 | Jeon ..................... H04J 11/005 370/252 |

OTHER PUBLICATIONS

X. Wang, et al., "A Unified Approach to QoS-Guaranteed Scheduling for Channel-Adaptive Wireless Networks," Invited Paper, Proceedings of the IEEE, vol. 95, No. 12, Dec. 2007, pp. 2410-2431.
List of IBM Patents or Patent applications Treated as Related; Date Filed: Sep. 9, 2016 p. 1-2.

* cited by examiner

ADAPTIVE MODULATION CODING METHOD AND APPARATUS

FOREIGN PRIORITY

This application claims priority to Chinese Patent Application No. 201410035685.3, filed Jan. 24, 2014, and all the benefits accruing therefrom under 35 U.S.C. §119, the contents of which in its entirety are herein incorporated by reference.

BACKGROUND

The present invention relates to wireless communication, and more specifically, to an adaptive modulation coding method and an apparatus thereof.

In a wireless communication system, Adaptive Modulation Coding (AMC) is widely used in order to enhance throughput of the whole system. AMC is a technology which adaptively changes modulation and coding scheme according to channel condition. Its basic working principle is as follows: a user at center of a cell, due to has better signal-to-interference-plus-noise ratio (SINR), is usually assigned a higher modulation coding scheme or coding rate to enhance throughput, e.g., 64 QAM, Turbo code with ¾ code rate; whereas a user at edge of a cell, whose SINR is low, is assigned lower modulation or coding rate (e.g., QPSK, Turbo code with ½ code rate) in order to ensure stability of the user. Using AMC has the following advantages: (1) user in a better channel condition can be assigned higher modulation scheme and coding rate, which can enhance average data throughput of the whole cell; (2) link level AMC that changes based on modulation coding scheme can reduce change in interference, as compared to the method that controls transmission power; and (3) by combining AMC with time domain scheduling, user terminal is maintained in a low fading status by utilizing fast fading feature of the terminal.

A typical process for downlink AMC is as follows: user terminal estimates SINR of the downlink in real time, and reports the estimated SINR information to a base station, the base station will determine a downlink modulation coding scheme to be used by user according to the SINR information reported by the user terminal. Such a working mechanism is widely used at present. If current system environment is ideal and there is no interference during data transmission, then such a mechanism may obtain relatively good performance. However, when there is interference in system's working environment, SINR estimated by the user terminal may not be able to truly reflect status of the wireless channel, resulting in that the modulation coding scheme determined according to this parameter is not the most appropriate. If modulation coding scheme of the user terminal is set too high, it will cause a large number of error codes, making system operation unstable. If modulation coding scheme of the user terminal is set too low, throughput of the system will be wasted.

Thus, there is a need for a method that can flexibly adjust modulation coding scheme employed by a user terminal in an interference environment.

SUMMARY

According to one aspect of the present invention, there is provided an adaptive modulation coding method, including obtaining an estimated SINR and a PER of a communication link of a user terminal; setting a first adjustment amount of the SINR of the communication link according to the PER of the communication link; calculating an effective SINR of the communication link according to the estimated SINR of the communication link and the first adjustment amount of the SINR of the communication link; and determining a modulation coding scheme of the communication link according to the effective SINR of the communication link.

According to another aspect of the present invention, there is provided an adaptive modulation coding apparatus, including a first obtaining module configured to obtain an estimated SINR and a PER of a communication link of a user terminal; a first setting module configured to set a first adjustment amount of the SINR of the communication link according to the PER of the communication link; a calculating module configured to calculate an effective SINR of the communication link according to the estimated SINR of the communication link and the first adjustment amount of the SINR of the communication link; and a determining module configured to determine a modulation coding scheme of the communication link according to the effective SINR of the communication link.

The method and apparatus according to embodiments of the present invention can flexibly adjust modulation coding scheme employed by user in an interference environment.

BRIEF DESCRIPTION OF THE DRAWINGS

Through the more detailed description of some embodiments of the present invention in the accompanying drawings, the above and other objects, features and advantages of the present invention will become more apparent, wherein the same reference generally refers to the same components in the embodiments of the present invention.

DETAILED DESCRIPTION

Exemplary embodiments will be described in more detail with reference to the accompanying drawings, in which the preferable embodiments of the present invention have been illustrated. However, the present invention can be implemented in various manners, and thus should not be construed to be limited to the embodiments disclosed herein. On the contrary, those embodiments are provided for the thorough and complete understanding of the present invention, and completely conveying the scope of the present invention to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
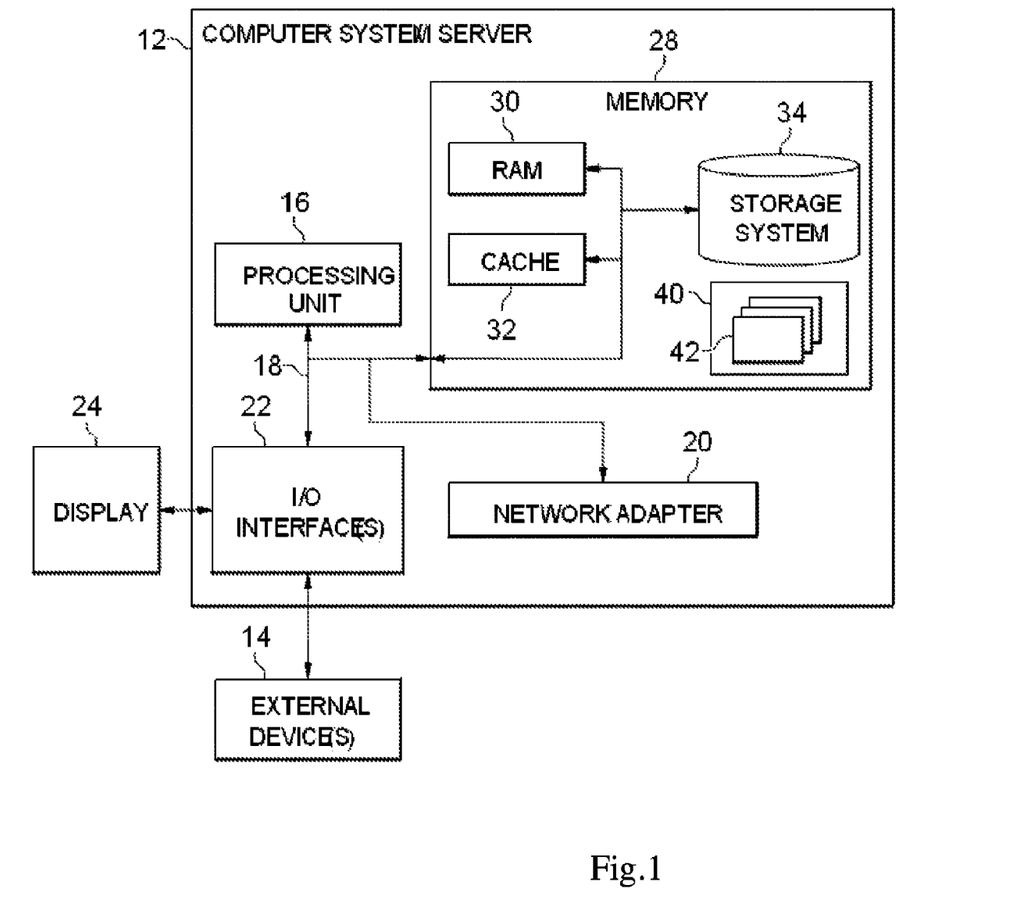
FIG. 1 shows a block diagram of an exemplary computer system/server which is applicable to implement the embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
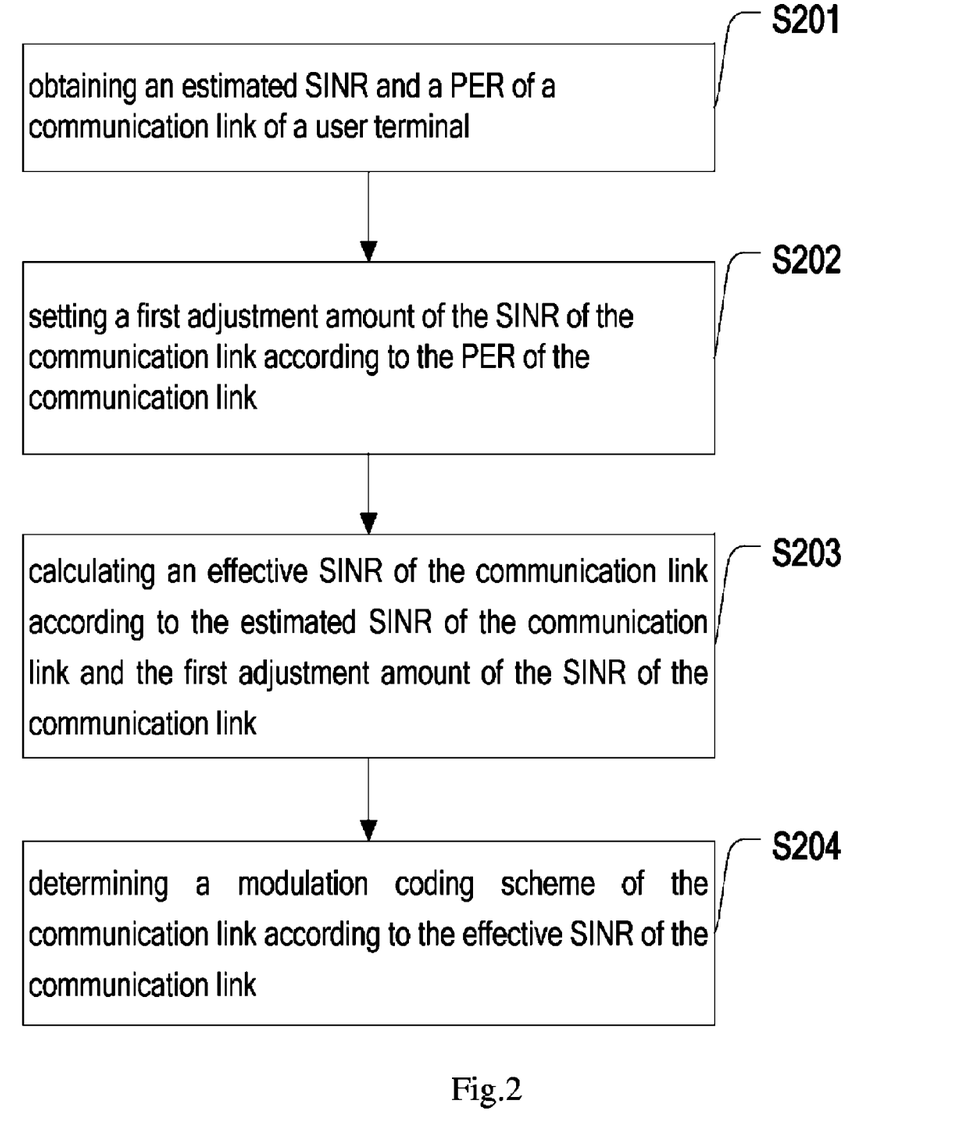
FIG. 2 shows an adaptive modulation coding method according to an embodiment of the present invention.

With reference now to FIG. 2, which shows an adaptive modulation coding method according to an embodiment of the invention, comprising: in block S201, obtaining an estimated SINR and a PER of a communication link of a user terminal; in block S202, setting a first adjustment amount of the SINR of the communication link according to the PER of the communication link; in block S203, calculating an effective SINR of the communication link according to the estimated SINR of the communication link and the first adjustment amount of the SINR of the communication link; in block S204, determining a modulation coding scheme of the communication link according to the effective SINR of the communication link.

In block S201, obtaining an estimated SINR and a PER of a communication link of a user terminal, wherein the SINR is a ratio of signal power to noise power plus interference power, so it is necessary to estimate the power of signal and the power of noise plus interference. In general, noise power and interference power are estimated together, and will not be specifically distinguished. Methods for estimating SINR are usually divided into blind estimation method and pilot assisted estimation method according to characteristics of signal. The blind estimation method, without assistance of any pilot, generally utilizes methods of second-order matrix, fourth-order matrix, or some subspace methods; it has relatively lower estimation accuracy and relatively higher complexity, accuracy thereof will be greatly reduced especially under interference condition. The pilot assisted estimation method is to estimate SINR by using known pilots or a preamble sequence, which is simple in implementation and also has high estimation accuracy. Therefore, typical wireless communication systems all employ this approach to estimate SINR. For example, current popular 4G communication system WiMAX or LTE will transmit a pilot sequence in its downlink signal, which is generally a pseudorandom sequence to be used in terminal's time synchronization, frequency synchronization etc., therefore, this pilot sequence can be utilized to estimate downlink SINR thereof. The communication link comprises at least one of an uplink and a downlink. As for the uplink, generally in data region, pilots will also be inserted to be used in channel estimation, therefore, these pilots can be utilized to estimate uplink SINR. The estimated SINR of downlink is estimated at the terminal and is sent to a base station, therefore, the estimated SINR of the downlink can be obtained from the base station. Those skilled in the art will appreciate that, PER (Packet Error Rate) is a ratio of packets transmitted with error to total transmitted packets within a specified time, which can effectively reflect actual communication quality of a current wireless link; and specific method for calculating PER will not be described here. The estimated SINR and the PER of an uplink can be calculated at base station side, the estimated SINR and the PER of a downlink need to be calculated at user terminal and fed back to the base station; thus, the estimated SINR and the PER of an uplink and a downlink can be obtained from base station.

In block S202, setting a first adjustment amount of the SINR of the communication link according to the PER of the communication link. If the PER is too high, it indicates that the actually set modulation coding scheme is too high, that is, actual SINR is relatively high as compared to the estimated SINR under interference condition, so it is necessary to perform a certain amount of downward adjustment on the estimated SINR. If the PER is very low, it indicates that the actually set modulation coding scheme is too conservative, which instead will influence rate, i.e., actual SINR is relatively low as compared to the estimated SINR under interference condition; so it is necessary to perform a certain amount of upward adjustment on the estimated SINR. For example, when the PER is greater than 10%, the first adjustment amount may be set as −2 dB; when the PER is between 10% and 3%, the first adjustment amount may be set as −1 dB; when the PER is between 3% and 1%, the first adjustment amount may be set as 0 dB; when the PER is less than 1%, the first adjustment amount may be set as 1 dB. The first adjustment amount of the SINR is an accumulative adjustment on the estimated SINR along a continuous statistic collecting time axis; for example, initial value of the first adjustment amount is 0, if the PER counted in a current time period is 5%, then the first adjustment amount is adjusted to −2 dB; if the PER counted in a subsequent time period is 2%, then it is necessary to further adjust the first adjustment amount by −1 dB; i.e., adjust it to −3 dB.

In block S203, calculating an effective SINR of the communication link according to the estimated SINR of the communication link and the first adjustment amount of the SINR of the communication link. According to an embodiment of the invention, for case of a downlink, further comprises: obtaining the estimated SINR and the PER of the downlink of the user terminal, wherein the estimated SINR of the downlink is estimated at the terminal and the estimated result is sent to a base station, therefore, the estimated SINR of the downlink can be obtained from the base station; setting the first adjustment amount of the SINR of the downlink according to the PER of the downlink; calculating the effective SINR of the downlink according to the estimated SINR of the downlink and the first adjustment amount of the SINR of the downlink.

According to an embodiment of the invention, the effective SINR of the downlink is calculated according to the following formula: $SINR\_eff_{downlink} = SINR\_est_{downlink} + SINR\_per_{downlink}$, wherein $SINR\_eff_{downlink}$ represents the effective SINR of the downlink, $SINR\_est_{downlink}$ represents the estimated SINR of the downlink, and $SINR\_per_{downlink}$ represents the first adjustment amount of the SINR of the downlink.

According to an embodiment of the invention, for case of the uplink, further comprises: obtaining the estimated SINR and the PER of the uplink of the user terminal, wherein the estimated SINR and the PER of the uplink are calculated by base station, therefore, they can be obtained from the base station; setting the first adjustment amount of the SINR of the uplink according to the PER of the uplink, for specific method thereof, reference may be made to the above description, which will not be repeated here for brevity; calculating the effective SINR of the uplink according to the estimated SINR of the uplink and the first adjustment amount of the SINR of the uplink. According to an embodiment of the invention, the effective SINR of the uplink is calculated according to the following formula:

$SINR\_eff_{uplink} = SINR\_est_{uplink} + SINR\_per_{uplink}$, wherein $SINR\_eff_{uplink}$ represents the effective SINR of the uplink, $SINR\_est_{uplink}$ represents the estimated SINR of the uplink, and $SINR\_per_{uplink}$ represents the first adjustment amount of the SINR of the uplink.

In block S204, determining a modulation coding scheme of the communication link according to the effective SINR of the communication link. Those skilled in the art should appreciate that, determining a modulation coding scheme of an uplink and a downlink based on SINR belongs to common knowledge in the art, which can be obtained via various public approaches. The following merely provides an example of determining modulation coding scheme of an uplink and a downlink based on effective SINR. As shown in Table 1, for each modulation coding scheme, there is an enter effective SINR and a leave effective SINR. For example, 64 QAM½ has an enter effective SINR of 21 dB and a leave effective SINR of 18 dB, i.e., in case that current modulation coding scheme is 16 QAM½, when the effective SINR is greater than 21 dB, the modulation coding scheme will be adjusted to 64 QAM½. In case that current modulation coding scheme is 64 QAM½, when the effective SINR is less than 18 dB, the modulation coding scheme will be adjusted to 16 QAM½.

TABLE 1

| Modulation Coding Scheme | Enter SINR | Leave SINR |
| --- | --- | --- |
| QPSK 1/2 | Min | 100 |
| 16QAM 1/2 | 15 | 12 |
| 64QAM 1/2 | 21 | 18 |
| 64QAM 2/3 | 24 | 21 |
| 64QAM 3/4 | 27 | 24 |

The effective SINR of a communication link according to embodiments of the invention takes into consideration influence of PER in actual interference environment on the estimated SINR, and flexibly adjusts the estimated SINR, so as to select an appropriate modulation coding scheme for user terminal.

According to an embodiment of the invention, further comprising: detecting a feedback status of the uplink and the downlink of the user terminal; setting a second adjustment amount of the SINR of the uplink and the downlink according to the feedback status of the uplink and the downlink; wherein the calculating an effective SINR of the communication link according to the estimated SINR of the communication link and the first adjustment amount of the SINR of the communication link comprises: calculating the effective SINR of the communication link according to the estimated SINR of the communication link, the first adjustment amount of the SINR of the communication link and the second adjustment amount of the SINR of the uplink and the downlink.

Since information such as estimated SINR and PER of a downlink needs to be calculated by a terminal and fed back to a base station, the base station needs to set control messages for querying these information, wherein the base station sends a request message, and the terminal feeds back a response message; according to an embodiment of the invention, the second adjustment amount of the SINR of the uplink and the downlink is set according to the feedback status of the message. Specifically, the detecting a feedback status of the communication link of the user terminal comprises: sending a data request message to the user terminal; setting the second adjustment amount of the SINR of the uplink and the downlink as 0, in response to receiving a data request packet from the user terminal before a predetermined time; setting the second adjustment amount of the SINR of the uplink and the downlink as a negative value, in response to not receiving the data request packet sent by the user terminal before the predetermined time.

According to an embodiment of the invention, for case of the downlink, further comprises: detecting a feedback status of the uplink and the downlink of the user terminal; setting the second adjustment amount of the SINR of the uplink and the downlink according to the feedback status of the uplink and the downlink; calculating the effective SINR of the downlink according to the estimated SINR of the downlink, the first adjustment amount of the SINR of the downlink and the second adjustment amount of the SINR of the uplink and the downlink.

According to an embodiment of the invention, the formula for calculating the effective SINR of the downlink according to the estimated SINR of the downlink, the first adjustment amount of the SINR of the downlink and the second adjustment amount of the SINR of the uplink and the downlink is shown as follows:

$SINR\_eff_{downlink} = SINR\_est_{downlink} + SINR\_per_{downlink} + SINR\_fd_{uplink\&downlink}$, wherein $SINR\_eff_{downlink}$ represents the effective SINR of the downlink, $SINR\_est_{downlink}$ represents the estimated SINR of the downlink, $SINR\_per_{downlink}$ represents the first adjustment amount of the SINR of the downlink, $SINR\_fd_{uplink\&downlink}$ represents the second adjustment amount of the SINR of the uplink and the downlink.

According to an embodiment of the invention, for case of the uplink, further comprises: detecting a feedback status of the uplink and the downlink of the user terminal; setting the second adjustment amount of the SINR of the uplink and the downlink according to the feedback status of the uplink and the downlink, wherein for detailed implementation method for detecting the feedback status and setting the second adjustment amount of the SINR, reference may be made to the above description, which will not be repeated here for brevity; calculating the effective SINR of the uplink according to the estimated SINR of the uplink, the first adjustment amount of the SINR of the uplink and the second adjustment amount of the SINR of the uplink and the downlink.

According to an embodiment of the invention, the formula for calculating the effective SINR of the uplink according to the estimated SINR of the uplink, the first adjustment amount of the SINR of the uplink and the second adjustment amount of the SINR of the uplink and the downlink is shown as follows:

$SINR\_eff_{uplink} = SINR\_est_{uplink} + SINR_{13}per_{uplink} + SINR\_fd_{uplink\&downlink}$, wherein $SINR\_eff_{uplink}$ represents the effective SINR of the uplink, $SINR\_est_{uplink}$ represents the estimated SINR of the uplink, SINR_per$_{uplink}$ represents the first adjustment amount of the SINR of the uplink, SINR_fd$_{uplink\&downlink}$ represents the second adjustment amount of the SINR of the uplink and the downlink.

The method according to the above embodiments, on basis of taking into consideration influence of stability of actual interference environment on the estimated SINR, also takes into consideration influence of communication quality of the wireless link on the estimated SINR, such that the effective SINR is more close to real value, thus selects a more appropriate modulation coding scheme for the user terminal.

According to an embodiment of the invention, further comprises: obtaining a service type of the communication link of the user terminal; setting a third adjustment amount of the SINR of the communication link according to the service type of the communication link; wherein the calculating the effective SINR of the communication link according to the estimated SINR of the communication link, the first adjustment amount of the SINR of the communication link and the second adjustment amount of the SINR of the uplink and the downlink comprises: calculating the effective SINR of the communication link according to the estimated SINR of the communication link, the first adjustment amount of the SINR of the communication link, the second adjustment amount of the SINR of the uplink and the downlink, and the third adjustment amount of the SINR of the communication link.

According to an embodiment of the invention, for case of the downlink, further comprises: obtaining a service type of the downlink of the user terminal; setting a third adjustment amount of the SINR of the downlink according to the service type of the downlink; calculating the effective SINR of the downlink according to the estimated SINR of the downlink, the first adjustment amount of the SINR of the downlink, the second adjustment amount of the SINR of the uplink and the downlink, and the third adjustment amount of the SINR of the uplink; determining a modulation coding scheme of the uplink according to the effective SINR of the downlink.

According to an embodiment of the invention, the formula for calculating the effective SINR of the downlink according to the estimated SINR of the downlink, the first adjustment amount of the SINR of the downlink, the second adjustment amount of the SINR of the uplink and the downlink, and the third adjustment amount of the SINR of the uplink is shown as follows:

SINR_eff$_{downlink}$=SINR_est$_{downlink}$+SINR_per$_{downlink}$+SINR_fd$_{uplink\&downlink}$+SINR_st$_{downlink}$, wherein SINR_eff$_{downlink}$ represents the effective SINR of the downlink, SINR_est$_{downlink}$ represents the estimated SINR of the downlink, SINR_per$_{downlink}$ represents the first adjustment amount of the SINR of the downlink, SINR_fd$_{uplink\&downlink}$ represents the second adjustment amount of the SINR of the uplink and the downlink, and SINR_st$_{downlink}$ represents the third adjustment amount of the SINR of the downlink.

According to an embodiment of the invention, for case of the uplink, further comprises: obtaining a service type of the uplink of the user terminal; setting a third adjustment amount of the SINR of the uplink according to the service type of the uplink; calculating the effective SINR of the uplink according to the estimated SINR of the uplink, the first adjustment amount of the SINR of the uplink, the second adjustment amount of the SINR of the uplink and the downlink, and the third adjustment amount of the SINR of the uplink; determining a modulation coding scheme of the uplink according to the effective SINR of the uplink.

According to an embodiment of the invention, the formula for calculating the effective SINR of the uplink according to the estimated SINR of the uplink, the first adjustment amount of the SINR of the uplink, the second adjustment amount of the SINR of the uplink and the downlink, and the third adjustment amount of the SINR of the uplink is shown as follows:

SINR_eff$_{uplink}$=SINR_est$_{uplink}$+SINR_per$_{uplink}$+SINR_fd$_{uplink\&downlink}$+SINR_st$_{uplink}$, wherein SINR_eff$_{uplink}$ represents the effective SINR of the uplink, SINR_est$_{uplink}$ represents the estimated SINR of the uplink, SINR_per$_{uplink}$ represents the first adjustment amount of the SINR of the uplink, SINR_fd$_{uplink\&downlink}$ represents the second adjustment amount of the SINR of the uplink and the downlink, SINR_st$_{uplink}$ represents the third adjustment amount of the SINR of the uplink.

The setting a third adjustment amount of the SINR of the communication link according to the service type of the communication link comprises: performing positive adjustment on the third adjustment amount of the SINR of the communication link relative to a base value, in response to the service type of the communication link is a service type that is data transmission rate first; performing negative adjustment on the third adjustment amount of the SINR of the communication link relative to the base value, in response to the service type of the communication link is a service type that is stability first; setting the third adjustment amount of the SINR of the communication link as the base value, in response to the service type of the communication link is a service type giving consideration to both data transmission rate and stability.

According to an embodiment of the invention, for case of the downlink, setting the third adjustment amount of the SINR of the downlink according to the service type of the downlink comprises: performing positive adjustment on the third adjustment amount of the SINR of the downlink relative to a base value, in response to the service type of the downlink is a service type service type that is data transmission rate first; performing negative adjustment on the third adjustment amount of the SINR of the downlink relative to the base value, in response to the service type of the downlink is a service type that is stability first; setting the third adjustment amount of the SINR of the downlink as the base value, in response to the service type of the downlink is a service type giving consideration to both data transmission rate and stability.

According to an embodiment of the invention, for case of the uplink, setting the third adjustment amount of the SINR of the uplink according to the service type of the uplink comprises: performing positive adjustment on the third adjustment amount of the SINR of the uplink relative to a base value, in response to the service type of the uplink is a service type that is data transmission rate first; performing negative adjustment the third adjustment amount of the SINR of the uplink relative to the base value, in response to the service type of the uplink is a service type that is stability first; setting the third adjustment amount of the SINR of the uplink as the base value, in response to the service type of the uplink is a service type giving consideration to both data transmission rate and stability.

Different upper layer service types (e.g., voice, video, or file transfer, etc.) have different degrees of tolerance to system's real-time performance or PER; therefore, the third adjustment amount of the SINR of the uplink and the downlink needs to be set according to upper layer service type. For service that is data transmission rate first, for example, file transfer service, as it is neither sensitive to PER nor to real-time performance, positive adjustment may be performed on the third adjustment amount of the SINR of the uplink and the downlink relative to the base value, for example, set as 2 dB, so that the system is operated in a relatively high modulation coding scheme to ensure data rate and whole system capacity. For service type that is stability first, for example, video service sensitive to PER, very low PER is needed to ensure fluency of the video; therefore, negative adjustment may be performed on the third adjustment amount of the SINR of the uplink and the downlink relative to the base value, for example, set to −2 dB, so that the system is operated in a relatively low modulation coding scheme to ensure PER. For some service types that need to give consideration to both data transmission rate and stability, the third adjustment amount of the SINR of the uplink and the downlink may be set as the base value, for example, 0 dB, to obtain compromised performance. Coding adjustment mechanism of existing system does not consider differences among different service applications. The method according to embodiments of the invention, on basis of taking into consideration influence of stability and communication quality of actual interference environment on the estimated SINR, also takes into consideration influence of user's current service demand on the estimated SINR, thereby selecting a more appropriate modulation coding scheme for the user terminal.

Various embodiments for implementing the method of the invention have been described hereinabove with reference to accompanying drawings. Those skilled in the art will appreciate that, the above method may be implemented in software or in hardware at base station side, or be implemented in a combination of software and hardware. In addition, those skilled in the art will appreciate that, by implementing respective operations of the above method in software, hardware or a combination thereof, an adaptive modulation coding apparatus can be provided. Although the apparatus is the same as a general purpose processing device in hardware structure, due to function of the software contained therein, the apparatus presents features distinctive from the general purpose processing device, thereby forming the apparatus according to embodiments of the invention.

Figure 3:
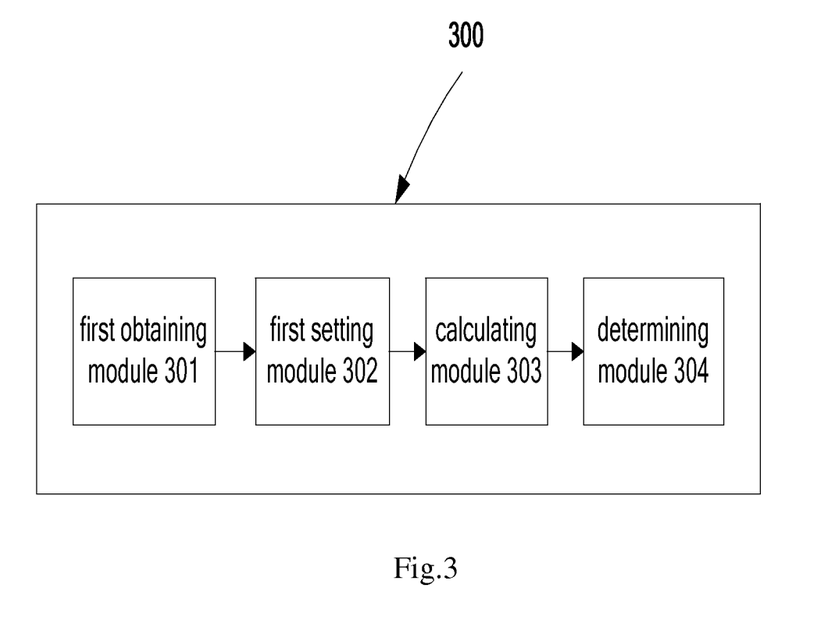
FIG. 3 shows an adaptive modulation coding apparatus according to an embodiment of the present invention.

Based on a same inventive concept, the present invention also sets forth an adaptive modulation coding apparatus. FIG. 3 shows an adaptive modulation coding apparatus 300 according to an embodiment of the invention, comprising: a first obtaining module 301 configured to obtain an estimated signal-to-interference-plus-noise ratio (SINR) and a packet error rate (PER) of a communication link of a user terminal; a first setting module 302 configured to set a first adjustment amount of the SINR of the communication link according to the PER of the communication link; a calculating module 303 configured to calculate an effective SINR of the communication link according to the estimated SINR of the communication link and the first adjustment amount of the SINR of the communication link; a determining module 304 configured to determine a modulation coding scheme of the communication link according to the effective SINR of the communication link. The adaptive modulation coding apparatus according to the embodiment of the present invention can be implemented at base station side.

According to an embodiment of the invention, further comprising: a detecting module configured to detect a feedback status of the communication link of the user terminal; a second setting module configured to set a second adjustment amount of SINR of an uplink and downlink according to the feedback status of the communication link, wherein the calculating module is further configured to: calculate the effective SINR of the communication link according to the estimated SINR of the communication link, the first adjustment amount of the SINR of the communication link and the second adjustment amount of the SINR of the uplink and downlink.

According to an embodiment of the invention, the detecting module is further configured to: send a data request message to the user terminal; set the second adjustment amount of the SINR of the uplink and downlink as 0, in response to receiving a data request packet from the user terminal before a predetermined time; set the second adjustment amount of the SINR of the uplink and downlink as a negative value, in response to not receiving the data request packet sent by the user terminal before the predetermined time.

According to an embodiment of the invention, further comprising: a second obtaining module configured to obtain a service type of the downlink of the user terminal; a third setting module configured to set a third adjustment amount of the SINR of the communication link according to the service type of the communication link; wherein the calculating module is further configured to: calculate the effective SINR of the communication link according to the estimated SINR of the communication link, the first adjustment amount of the SINR of the communication link, the second adjustment amount of the SINR of the uplink and downlink, and the third adjustment amount of the SINR of the communication link.

According to an embodiment of the invention, the third setting module is further configured to: perform positive adjustment on the third adjustment amount of the SINR of the communication link relative to a base value, in response to the service type of the communication link is a service type that is data transmission rate first; perform negative adjustment on the third adjustment amount of the SINR of the communication link relative to the base value, in response to the service type of the communication link is a service type that is stability first; set the third adjustment amount of the SINR of the communication link as the base value, in response to the service type of the communication link is a service type giving consideration to both data transmission rate and stability.

According to an embodiment of the invention, the communication link comprises at least one of the uplink and the downlink.

For detailed implementation of each of the above modules, reference may be made to the detailed description in the adaptive modulation coding method according to embodiments of the invention, which will not be repeated here for brevity.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An adaptive modulation coding apparatus, comprising:
a processor in communication with one or more types of memory, the processor configured to:
execute a first obtaining module configured to obtain an estimated signal-to-interference-plus-noise ratio (SINR) and a packet error rate (PER) of a communication link of a user terminal;
execute a first setting module configured to set a first adjustment amount of the SINR of the communication link according to the PER of the communication link;
execute a calculating module configured to calculate an effective SINR of the communication link according to the estimated SINR of the communication link and the first adjustment amount of the SINR of the communication link, wherein the effective SINR reflects a flexibly adjusted estimated SINR to enable a determining module to select an appropriate modulating coding scheme in a wireless communication environment;
execute a detecting module configured to:
detect a feedback status of the communication link of the user terminal;
send a data request message to the user terminal;
set the second adjustment amount of the SINR of the uplink and downlink as 0, in response to receiving a data request packet from the user terminal before a predetermined time;
set the second adjustment amount of the SINR of the uplink and downlink as a negative value, in response to not receiving the data request packet sent by the user terminal before the predetermined time; and
execute a second setting module configured to set a second adjustment amount of SINR of an uplink and downlink according to the feedback status of the communication link;
wherein the calculating module is further configured to:
calculate the effective SINR of the communication link according to the estimated SINR of the communication link, the first adjustment amount of the SINR of the communication link and the second adjustment amount of the SINR of the uplink and downlink; and
execute the determining module configured to determine the appropriate modulation coding scheme of the communication link according to the effective SINR of the communication link.

2. The apparatus according to claim 1, wherein the processor is further configured to:
execute a second obtaining module configured to obtain a service type of the downlink of the user terminal;
execute a third setting module configured to set a third adjustment amount of the SINR of the communication link according to the service type of the communication link;
wherein the calculating module is further configured to:
calculate the effective SINR of the communication link according to the estimated SINR of the communication link, the first adjustment amount of the SINR of the communication link, the second adjustment amount of the SINR of the uplink and downlink, and the third adjustment amount of the SINR of the communication link.

3. The apparatus according to claim 2, wherein the third setting module is further configured to:
perform positive adjustment on the third adjustment amount of the SINR of the communication link relative to a base value, in response to the service type of the communication link is a service type that is data transmission rate first;
perform negative adjustment on the third adjustment amount of the SINR of the communication link relative to the base value, in response to the service type of the communication link is a service type that is stability first;
set the third adjustment amount of the SINR of the communication link as the base value, in response to the service type of the communication link is a service type giving consideration to both data transmission rate and stability.

4. The apparatus according to claim 1, wherein the communication link comprises at least one of the uplink and the downlink.

* * * * *